United States Patent [19]

Honma et al.

[11] Patent Number: 5,343,387
[45] Date of Patent: Aug. 30, 1994

[54] CYCLIC MAINTENANCE WORK SCHEDULE TABLE PREPARATION SYSTEM

[75] Inventors: Masaki Honma; Akio Nakano; Kouzou Mabuti; Isamu Asahi, all of Tokyo; Setsuo Tsuruta; Nobuhiro Fujino, both of Kawasaki; Nobuhisa Kobayashi, Katsuta, all of Japan

[73] Assignees: Hitachi, Ltd.; Hitachi Building Systems and Engineering Service Co., both of Japan

[21] Appl. No.: 799,064

[22] Filed: Nov. 27, 1991

[30] Foreign Application Priority Data

Nov. 27, 1990 [JP] Japan .................................. 2-321145

[51] Int. Cl.⁵ .............................................. C06F 15/22
[52] U.S. Cl. ...................................... 364/401; 364/468
[58] Field of Search ............... 364/401, 406, 408, 468, 364/200 MS File

[56] References Cited

U.S. PATENT DOCUMENTS

| | | | |
|---|---|---|---|
| 4,852,001 | 7/1989 | Tsushima et al. | 364/401 |
| 4,896,269 | 1/1990 | Tong | 364/468 |
| 5,111,391 | 5/1992 | Fields et al. | 364/401 |

Primary Examiner—Roy N. Envall, Jr.
Assistant Examiner—Frantzy Poinvil
Attorney, Agent, or Firm—Wegner, Cantor, Mueller & Player

[57] ABSTRACT

A system is provided for the preparation of a cyclic maintenance work schedule table. The system includes a display unit which can show boxes defined by dates in a desired period and the names of individual workers. The system also has a worker data memory for storing scheduled work information of the individual workers during the period and work qualifications of the individual workers; a building data memory for storing the names, work details, last working dates, and contracted frequencies of maintenance work of buildings to be worked with during the period; a processor for deciding working dates in the period for the buildings stored in the building data memory; and another processor for allocating the names of the buildings in the descending order of the difficulty of work items on the basis of data - which have been obtained from the worker data memory, building data memory and working date deciding means - and, after one of the boxes has been filled with a predetermined working time, moving to another one of the boxes.

6 Claims, 19 Drawing Sheets

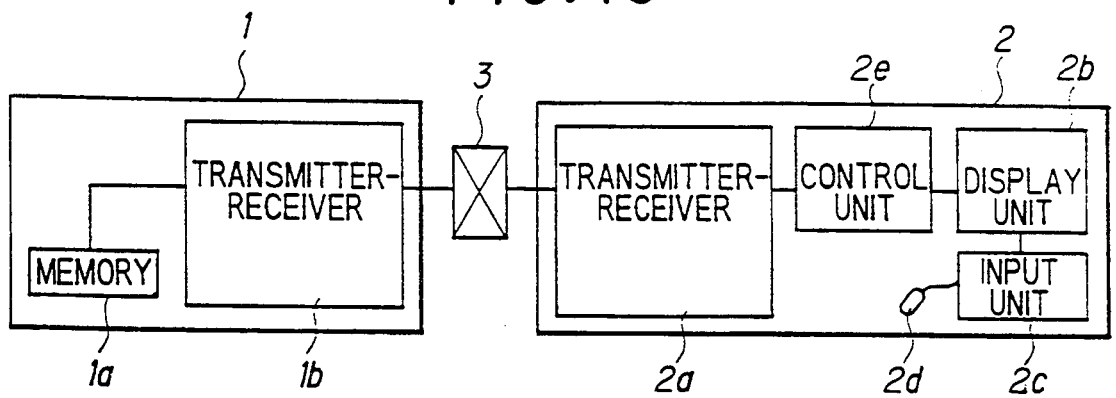

CYCLIC MAINTENANCE WORK SCHEDULE TABLE PREPARATION SYSTEM

BACKGROUND OF THE INVENTION

1. Field of the Invention

This invention relates to a building management system, and specifically to a cyclic building maintenance work schedule table preparation system useful in preparing a schedule table of cyclic work in advance upon sending workers to periodically visit client buildings under a maintenance contract to conduct inspection and the like of the buildings.

2. Description of the Related Art

In recent years, a variety of facilities led by elevators and/or escalators is provided inside a building. If one or more of these facilities become out of order, substantial inconvenience is given not only to tenants, dwellers or the like of the building but also to visitors, guests, customers and/or the like of the building. These facilities, therefore, require certain strict maintenance. The maintenance of these building facilities, however, must be conducted only by those having professional knowledge. As a consequence, the owner of a building generally concludes a contract with a maintenance service company specialized in the maintenance of these building facilities and entrusts the maintenance service company with the maintenance of the facilities. To meet such clients' desires, the maintenance service company sends professional workers to periodically visit the buildings of the client and to provide the clients with services such as inspection, repair, maintenance and the like of the facilities. To ensure such periodical visits, it is necessary to allocate the names and visiting dates of buildings, which are to be visited, to the individual workers. This allocation has heretofore been conducted by applying, with magnets, building name plates, worker name plates and the like on a diary board hung on a wall of a branch office. Such a diary board, however, lacks reliability because the name plates may drop from the diary board or the diary board itself may drop from the wall when large vibrations are applied and people passing by the diary board tend to bump and dislodge the name plates. The above-mentioned allocation must itself be conducted by well-experienced personnel and, moreover, the allocation requires appreciable time, thereby creating additional problems. Reasons for these problems will hereinafter be described.

First, it is necessary to allocate buildings such that each worker can visit buildings in the same area as much as possible, since the efficiency of cyclic maintenance work is better when visits are limited to the same area. Second, two workers may have to be allocated to the same building on the same date because two workers may be needed depending on the details of cyclic maintenance work, for example, for the repair of an elevator. Third, it is necessary to allocate the buildings after advance ascertainment of the work schedule (holiday, meeting, business trip, etc.) of each worker in advance. Fourth, working dates may be designated by clients. Priority must be given to such buildings upon allocation. Fifth, a standard building management contract generally requires two visits a month. There are, however, contracts which require only one visit every 2 or 3 months. Buildings must therefore be managed independently to avoid omission of building name plates which were not required in the preceding month. Sixth, some buildings may have to be allocated with top priority under unexpected circumstances such that the previous cyclic maintenance was not conducted as scheduled or the cyclic maintenance of the next month is to be conducted in advance. Seventh, allocation must be effected in comparison with the schedule for repair and countermeasure of other buildings because efficiency deteriorates if buildings are visited one after another only for repair and/or countermeasure work. Eighth, the facilities of each building must be subjected to the inspection requirements set by law. It is therefore necessary to allocate the building while checking against an inspection schedule so that the inspection of the building can be conducted within the specified term. Ninth, depending on the details of work, a high degree of skill may be required. Such work must be allocated to a worker having an appropriate certificate and experience. Tenth, the working time differs depending on the facilities of each building. Allocation must therefore be conducted with a view toward not exceeding the available daily working time of each worker.

To meet these requirements, the following proposal has been made. This will be described with reference to FIGS. 19 and 20. FIG. 19 is a block diagram of a cyclic building maintenance work schedule table preparation system. In a computer center 1 where processing of data of contracted client buildings is performed collectively, a memory $1a$ and a transmitter-receiver $1b$ are installed along with other equipment (not shown). To this computer center 1, a number of branch offices 2 are connected via a communications network 3. Each branch office 2 is equipped with a transmitter-receiver $2a$, a display unit $2b$ having first and second display areas, an input means for operating the display unit $2b$—said input means consisting of an input unit $2c$, such as a keyboard, and a mouse $2d$—and a control unit $2e$ for conducting predetermined control. An appropriate number of workers are stationed at each branch office 2, and the maintenance and management of the client buildings assigned to the branch office 2 are conducted by these workers.

The operation of the above system will next be described with reference FIG. 20, which is a plan view of details of a table displayed on the display unit $2b$. As is shown in FIG. 20, the display unit $2b$ has a first display area 4 and a second display area 5. At the first display area 4, buildings $B_1, B_2, \ldots B_n, \ldots$ entrusted to the branch office 2 are displayed in order. These building names and their arrangement will be described later. Displayed at the second display area 5 is a table in which the dates and days of each month are arranged horizontally while the names a,b, . . . of the workers belonging to the branch office are arranged vertically. A work schedule table preparator of the branch office successively allocates the client buildings while watching the building names displayed at the first display area 4 and also taking into consideration such various conditions as described above. This preparation work will be described later.

A description will now be made of the building names displayed at the first display area 4. First, at the computer center 1, based on the data stored in advance, the buildings are classified depending on their areas and the buildings in each area are then classified into two groups, one requiring two workers and the other one worker. In this case, in view of the fact that cyclic maintenance is conducted twice a month for each building as a standard and, regarding the details of work, two-man job and one-man job are alternated, the same building name is classified as both a two-man job and a one-man job. The building names classified as described above are stored in the memory 1a. At the branch office 2, the building names stored in the memory 1a of the computer center 1 are displayed at the first display area 4 of the display unit 2a via the communications network 3.

The work schedule table preparator then successively allocates the building names to the individual dates and workers displayed at the second display area 5. This is performed using the mouse 2d. To allocate, for example, the building $B_1$ to the cyclic work of the worker a for March 1, the building name $B_1$ displayed at the first display area 4 is designated by the mouse 2d and the box defined by the worker a and the date is then designated by the mouse 2d. As a result, the building name $B_1$ disappears from the first display area 4 and appears in the box.

Upon completion of a work schedule table by successively repeating such an operation, the branch office 2 sends data of the thus-completed work table other than the work details to the computer center 1 via the communications network 3, whereby these data are stored in place of the previously-stored building names in the memory 1a at the computer center 1. As a result, the building names relating to the work for the month are stored in the memory 1a in a form classified in accordance with their dates and areas, in the memory 1a. Based on the data so stored and other data, data on work for the next month will be prepared.

The cyclic maintenance work schedule table preparation system of FIG. 19 can perform the preparation of such a table far more easily and accurately than that achieved with the conventional preparation of a work table on a diary board. Nevertheless, the work schedule table preparator is required to busily operate the mouse while taking the conditions of the client buildings and those of the workers into parallel consideration. As far as the load for the preparation of a work schedule table is concerned, the above system still imposes a substantial load and is hence not much different from the conventional manner in this respect.

SUMMARY OF THE INVENTION

An object of this invention is to provide a cyclic maintenance work schedule table preparation system which can overcome the above-described problems of the conventional art and can reduce the load of a work schedule table preparator to significant extent.

To achieve the above object, the present invention provides a cyclic maintenance work schedule table preparation system having a display unit capable of showing thereon boxes defined by dates in a desired period and the names of individual workers. The cyclic maintenance work schedule table preparation system comprises a worker data memory for storing scheduled work information of the individual workers during the period and work qualifications of the individual workers; a building data memory for storing the names, work details, last working dates, and contracted frequencies of maintenance work of buildings to be worked during the period; a means for deciding working dates in the period for the buildings stored in the building data memory; and a means for allocating the names of the buildings in the descending order of the difficulty of work items on the basis of data—which have been obtained from the worker data memory, building data memory and working date deciding means—and, after one of the boxes has been filled with a predetermined working time, moving to another one of the boxes.

A work schedule table inputs scheduled holidays, business trips and the like of each worker for a predetermined period, for example, for one month in the worker data memory. In the worker data memory, qualification of each worker, for example, information on whether or not each worker is entitled to become a foreman of a two-man job has been stored in advance.

On the other hand, to each branch office, the names of buildings whose maintenance work must be conducted by the branch office during the desired period and the details of the work are transmitted to the branch office from the computer center which manages all the buildings. The data so transmitted are stored in the building data memory. Further, the names of buildings entrusted to the branch office, the numbers of contracted maintenance visits and the preceding working dates have been stored In the building data memory. The working date deciding means decides working dates (optimal date and permissible date) in the desired period for each designated building from the number of the contracted maintenance visits and the last working date. The allocation means first successively reads the names of buildings, which require a two-man job, from the building data memory and allocates them to appropriate boxes on the display unit in view of the working dates decided by the working date deciding means and the schedule and qualification of each worker stored in the worker data memory. Such allocation is conducted to the corresponding same box until the time of the work so allocated reaches a predetermined working time, and is not effected to any other vacant boxes. After the working time of the box has reached a predetermined working time, allocation is effected to another box for the first time. After the allocation of the building names requiring a two-man job has been completed as described above, the allocation means then successively allocates the building names requiring a one-man job in a similar manner to the allocation of the two-man jobs.

As has been described above, the preparation of a work schedule table can be performed automatically except that the work schedule table preparator inputs necessary data to the worker data memory and the building data memory. The load of the work schedule table preparator can therefore been reduced substantially.

BRIEF DESCRIPTION OF THE DRAWINGS

FIG. 19 is a block diagram of a conventional cyclic maintenance work schedule table preparation system; and FIG. 20 is a plan view of a table prepared by the system of FIG. 19.

DETAILED DESCRIPTION OF THE INVENTION AND PREFERRED EMBODIMENT

Figure 1:
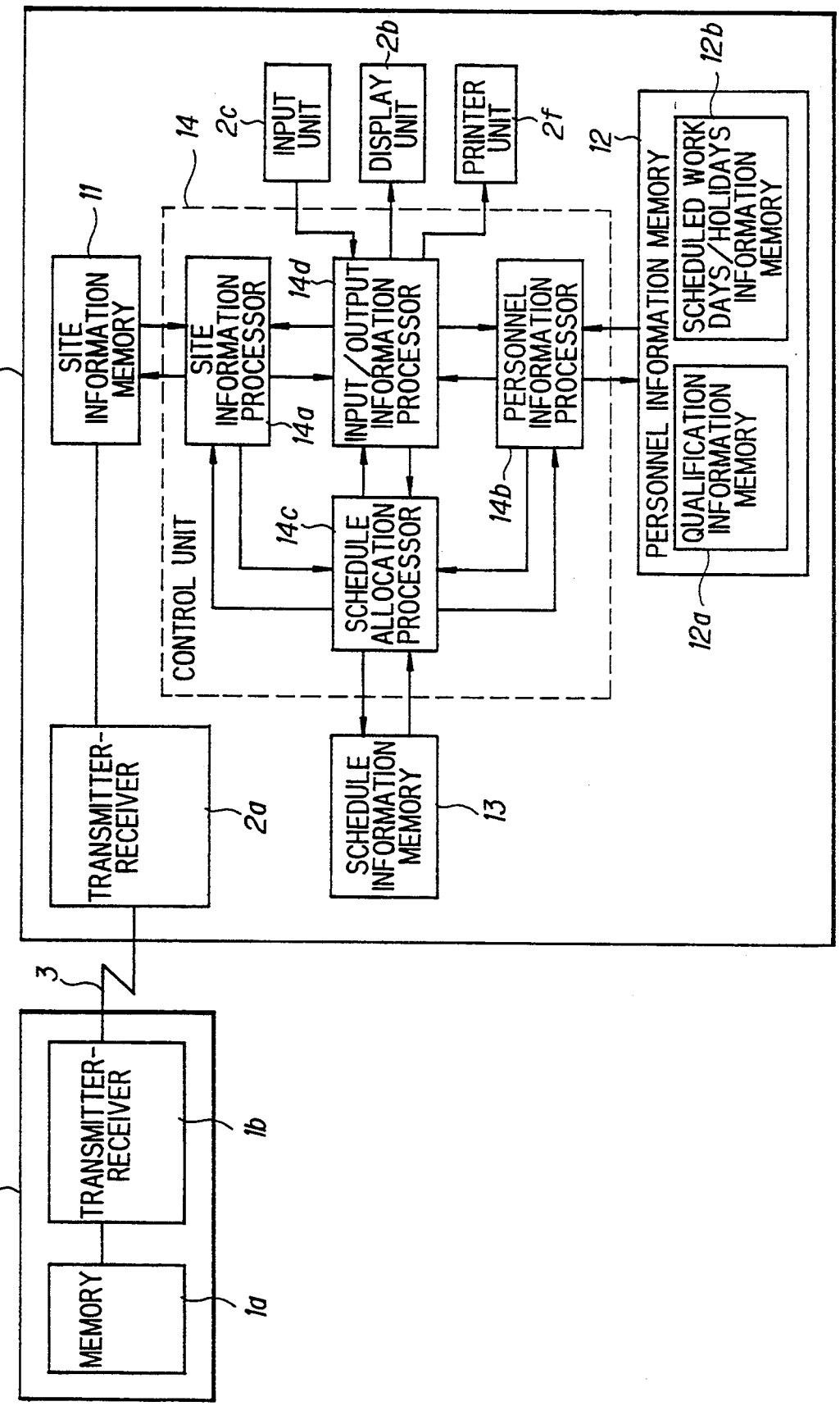
FIG. 1 is a block diagram of a cyclic maintenance work schedule table preparation system according to one embodiment of this invention.

The cyclic maintenance work schedule table preparation system according to one embodiment of this invention will hereinafter be described with reference to FIG. 1, in which elements of structure similar to those shown in FIG. 19 are identified by like reference numerals or symbols. Description of these similar elements is therefore omitted herein. Symbol 2f designates a printer unit such as a printer.

Figure 2:
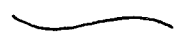
FIG. 2 is a plan view of a table prepared by the system of FIG. 1.
Figure 3:
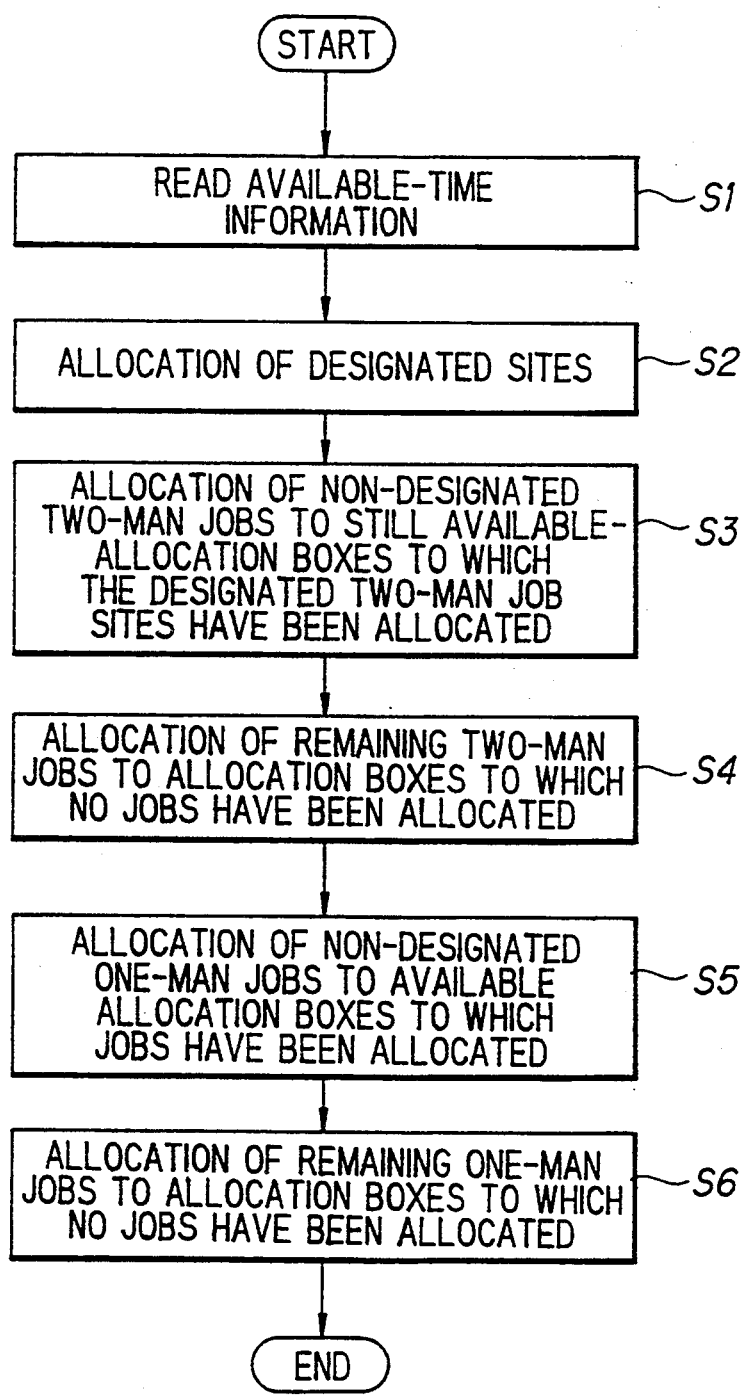
FIGS. 3–18 are flow charts of operations of the system depicted in FIG. 1.

A work schedule table preparation unit of this embodiment is constructed of a site information memory 11, a personnel information memory 12, a schedule information memory 13 and a control unit 14. In the site information memory 11 out of these memories and unit, information relating to the maintenance of buildings managed by the branch office 2 out of the information stored in the memory 1a of the computer center 1 has been received and stored via the transmitter-receiver 2a. The above maintenance-related information includes the address of each building, the presence or absence of any designation as to its working date, details of its work (one-man job or two-man job?), etc. On the other hand, the personnel information memory 12 is constructed of a qualification information memory 12a and a scheduled work days/holidays information memory 12b. The qualification information memory 12a is adapted to store the qualification as a worker of each worker belonging to the branch office 2, while the scheduled work days/holidays information memory 2b is employed to store his working schedule for this month (i.e., July in this embodiment, as shown in FIG. 3). The qualifications of the above workers include "maintenance", "work standard", "inspection", etc. Important work such as a two-man job requires that at least one of the two workers has a "maintenance" certificate. Further, there are work which are basically the work of two-man job sites but may be conducted by one worker. "Work standard" means the certificate which enables to conduct such work. "Maintenance" and "work standard" are the certificates that permit one-man jobs. "Inspection" means the certificate that permits only inspection work out of one-man jobs but does not permit any other one-man jobs. Besides these qualified workers, there are also workers which have not been qualified. The above work days/holidays information includes, besides paid annual holidays, schedules dates and times of meetings, business trips, trainings and the like as described above. Details to be displayed in the individual boxes shown in FIG. 2 are stored in the schedule information memory 13.

The control unit 14 is constructed of a site information processor 14a, a personnel information processor 14b, a schedule allocation processor 14c and an input-/output information processor 14d. The site information processor 14a serves to read information stored in the site information memory 11. The personnel information processor 14b is adapted to read information stored in the personnel information memory 12. The schedule allocation processor 14c serves to perform allocation of cyclic maintenance work under control. The input/output information processor 14d is employed to perform input of data and commands and output of processed data to the display units 2b and the like. These processors 14a–14d are constructed of microprocessors, respectively.

Operation of the system according to this embodiment will next be described with reference to the flow charts illustrated in FIG. 3 to FIG. 18. First, the outline of operation of the system of this embodiment will be described based on the flow chart shown in FIG. 3.

Allocation of work in this embodiment is effected under the control of the schedule allocation processor 14c.

First, the processing of step $S_1$ shown in FIG. 3 is performed. Namely, the schedule allocation processor 14c commands the personnel information processor 14b to read the available time of each worker, and the personnel information processor 14b then arranges the data stored in the personnel information memory 12 and outputs them to the schedule allocation processor 14c. The schedule allocation processor 14c stores the available time of each worker in its own memory.

Then, the schedule memory 14c performs allocation by the processings of steps $S_2$–$S_6$. Although these steps will be described later in detail with reference to FIG. 4 to FIG. 18, they will be outlined here. The schedule memory 14c allocates buildings (sites), whose working dates have been designated, to the designated dates, respectively (step $S_2$). Next, other buildings requiring a two-man job are allocated to the boxes with the two-man job buildings out of the buildings which were allocated in step $S_2$ (step $S_3$). When the working time of one of the boxes has reached a limit as described above, two-man job buildings are allocated to another one of the boxes to which the two-man jobs were allocated, respectively, in step $S_2$. If there are still unallocated two-man job buildings after the completion of allocation to said another box, these buildings are successively allocated to vacant boxes (step $S_4$). After the allocation of the two-man job buildings has been completed, one-man jobs are allocated one by one to boxes which have buildings already allocated thereto and have remaining working time (step $S_5$). Subsequent to the completion of this allocation, remaining one-man jobs are successively allocated to vacant boxes (step $S_6$) to complete the entire allocation work.

Each "box" referred to above is defined by a worker and a working date as shown in FIG. 2, so that the above allocation is performed in view of the qualification of each worker and the work candidate dates of each building. Here, the term "work candidate dates" as used herein means the date passed over a predetermined interval from the last working date and its preceding and subsequent several days. Needless to say, the place of each building to be worked and the available working time of each worker are taken into consideration in addition to the parameters described above.

The allocation processing performed by the schedule allocation processing unit 14c will next be described in detail.

Figure 4:
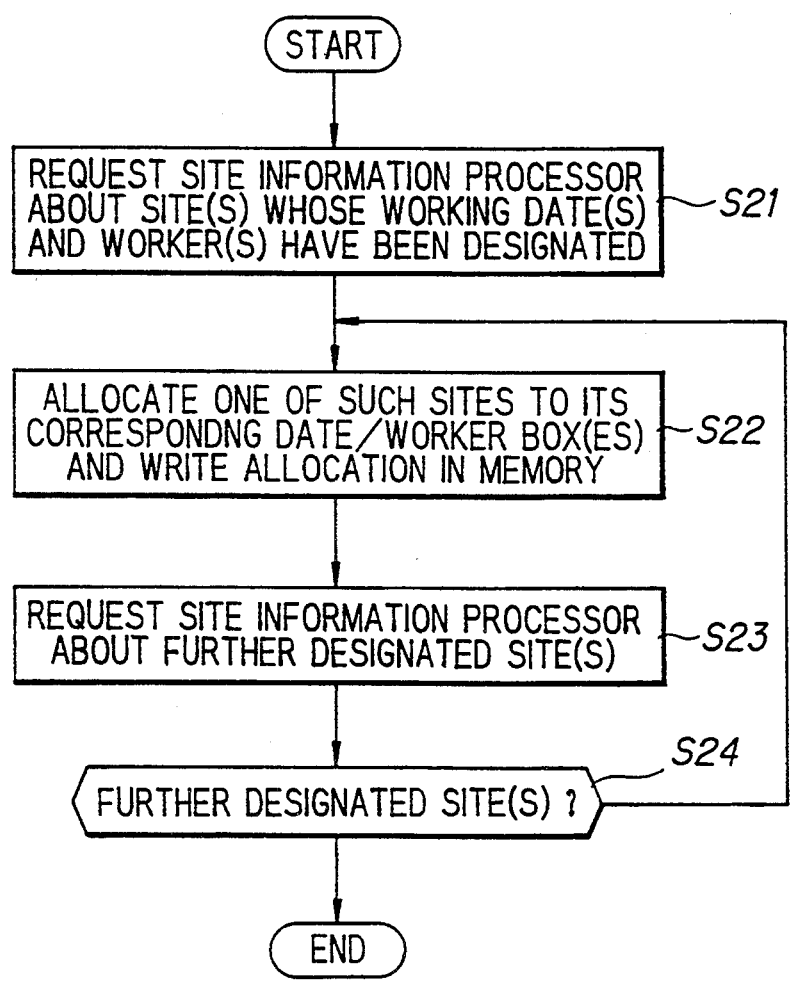

(1) Processing of Step $S_2$ in FIG. 3 (FIG. 4)

The schedule allocation processing unit 14c requests the site information processing unit 14a about building(s) [site(s)] whose working date(s) and worker(s) or whose working date(s) alone have been designated. Based on the information stored in the site information memory 11, the site information processor 14a retrieves and stores such site(s). The site information processor 14a then outputs one of the sites to the schedule allocation processor 14c and erases the memory of the site (step $S_{21}$). The schedule allocation processing unit 14c allocates the site to the box defined by the designated date and the designated worker (step $S_{22}$). Where the worker is not designated and the working date is designated solely, the designation of a worker is conducted in the order of arrangement of workers in a directory of workers (for example, in the order of names shown in FIG. 2) read by a command from the personnel information processor 14b while taking his qualification into consideration.

Next, the schedule allocation processor 14c requests the site information processor 14a if there is(are) still other site(s) of the above condition (step $S_{23}$). The site information processor 14a judges that there is(are) still designated site(s) when the previously retrieved sites are still stored in its memory, and outputs the next one site to the schedule allocation processor 14c. The processings of steps $S_{22}$–$S_{24}$ are thereafter repeated so that the sites with designated working dates are all allocated to the designated dates, respectively.

At the end of the above processings, building names have been written in the respective boxes shown in FIG. 2.

Figure 5:
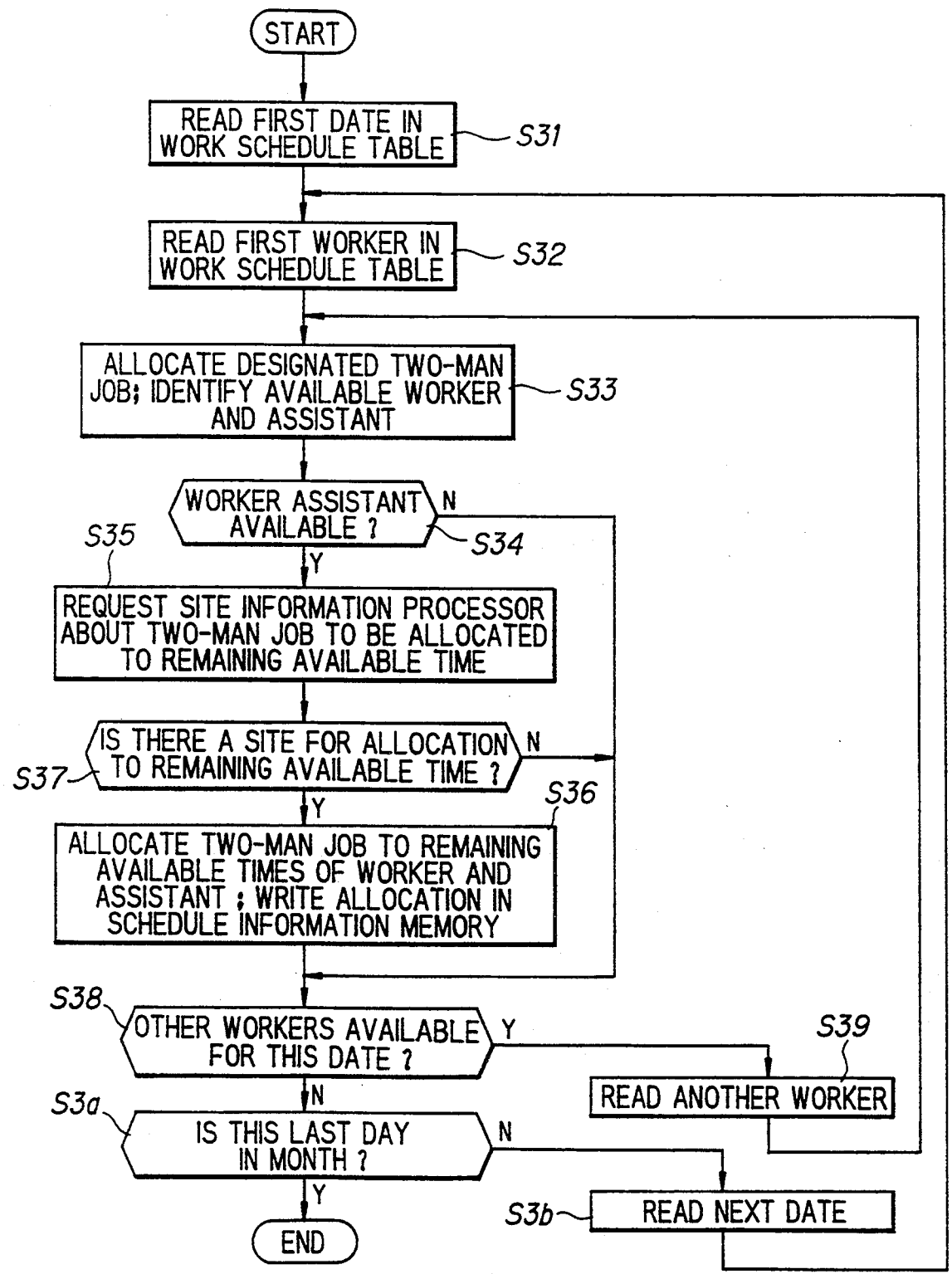
Figure 6:
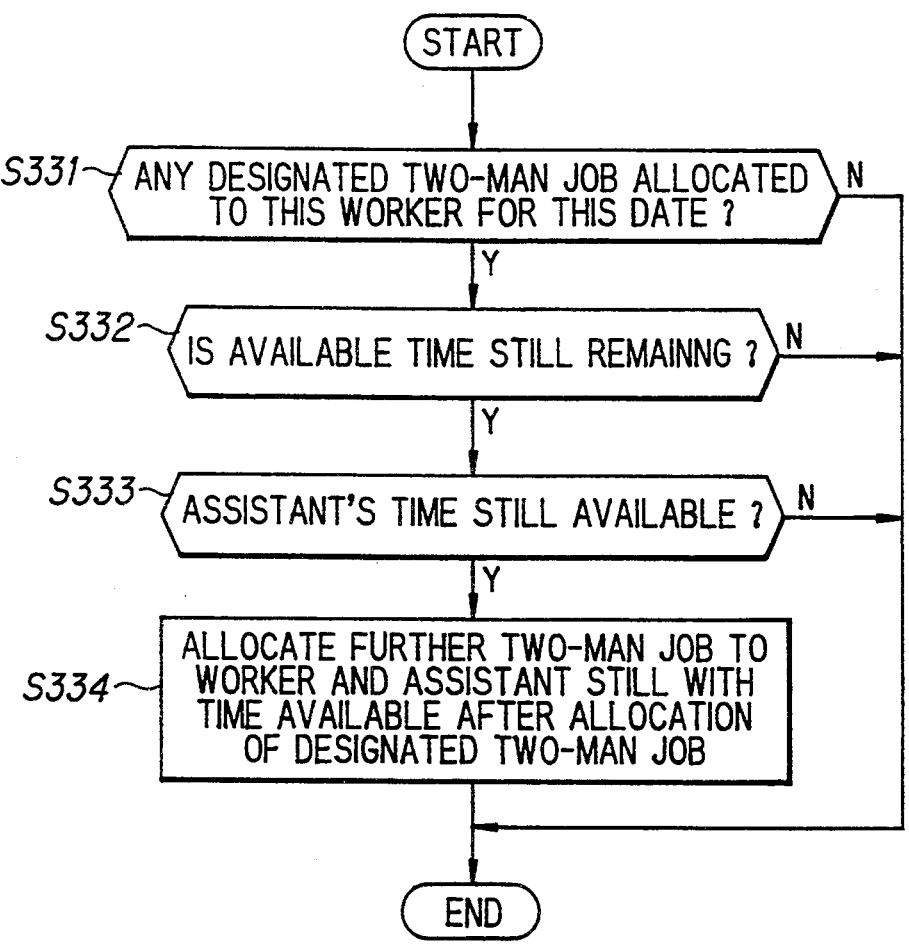
Figure 7:
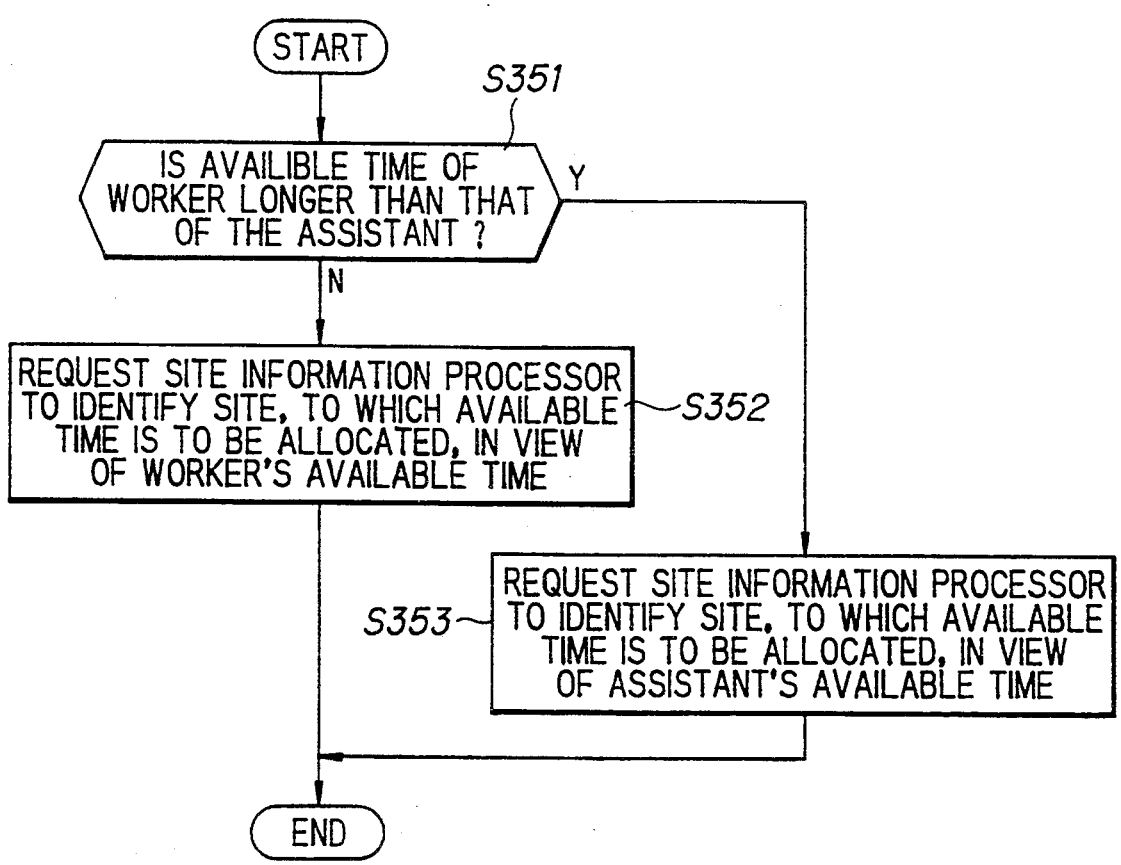

(2) Processing of Step $S_3$ in FIG. 3 (FIGS. 5–7)

According to this processing, sites whose working dates are not designated are written one by one in the boxes, in which no two-man job is written, out of the boxes in which building names (site names) were written by the processing of step $S_2$.

The schedule allocation processor 14c reads the first date (July 1) of the work schedule table (FIG. 2) from the schedule information memory 13 (step $S_{31}$) and then reads the first worker (Mr. a) in the same work schedule table (step $S_{32}$).

The processing of step $S_{33}$ is now performed with respect to Mr. a for July 1. This processing will hereinafter be described in detail with reference to FIG. 6. The schedule allocation processor 14c reads the box of Mr. a for July 1 in the schedule information memory 13 and judges if there is(are) two-man job site(s) in the box (step $S_{331}$ in FIG. 6). If there is(are) site(s), the schedule allocation processor 14c sums the working time(s) of the site(s) and also judges if there is any available time of Mr. a (step $S_{332}$). When Mr. a still has some available time, a judgment is then made as to whether the assistant (i.e., the worker who performs two-man jobs together with Mr. a and is supposed to be designated in advance) still has some available time or not (step $S_{333}$). When the assistant still has some available time, Mr. a and the assistant are decided to be workers for a further two-man job site to be allocated to the box (step $S_{334}$). The routine then advances to step $S_{35}$ in FIG. 5.

When any designated two-man job site is not allocated to July 1 in step $S_{331}$, the routine moves to step $S_{3a}$ in FIG. 5, where the schedule allocation processor 14c judges that this DATE is not the last day in the month. The schedule allocation processor 14c then reads the next date (July 2) (step $S_{3b}$) and the processings of $S_{32}$ onwards will be repeated. On the other hand, when neither Mr. a nor the assistant is judged to have no available time in steps $S_{332}$ and $S_{333}$ of FIG. 6, the routine advances to step $S_{38}$ in FIG. 6, where the schedule allocation processor 14c makes the personnel information processor 14b retrieve if there is(are) any other qualified worker(s) other than Mr. a on July 1. The schedule allocation processor 14c also judges if there is(are) any worker(s) having available time as assistant(s). If there are such workers, they are chosen (step $S_{39}$) and the routine then returns to step $S_{33}$. After going through steps $S_{3a}$ and $S_{3b}$, the processings of step $S_{32}$ onwards are executed for the next day.

A description will now be made of the processings of steps $S_{35}$, $S_{36}$ and $S_{37}$ in FIG. 5. The processing of step $S_{35}$ is conducted when two-man job site(s) with designated working dates have been allocated to the box of Mr. a for July 1 and, moreover, both Mr. a and his assistant have available time. In this case, in step $S_{35}$, the further two-man job site whose working date is not designated is allocated to the box of Mr. a for July 1. Details of this processing is illustrated in FIG. 7. The schedule allocation processor 14c compares the available time of Mr. a with that of the assistant (step $S_{351}$). Mr. a may have scheduled meeting(s) or the like so that their available times are not always equal. When the assistant has longer available time, the schedule allocation processor 14c asks the site information processor 14a to identify, based on the available time of Mr. a, a two-man job site corresponding to the available time of Mr. a (step $S_{352}$). The site information processor 14a then judges if there is such a site (step $S_{36}$ in FIG. 5) and, based on the judgment, the schedule allocation processor 14c has the routine advanced to step $S_{38}$ if such a site is not found. If there is such a site, the site is allocated to the box of Mr. a for July 1 and this allocation is written in the schedule information memory 13 (step $S_{37}$).

Figure 8:
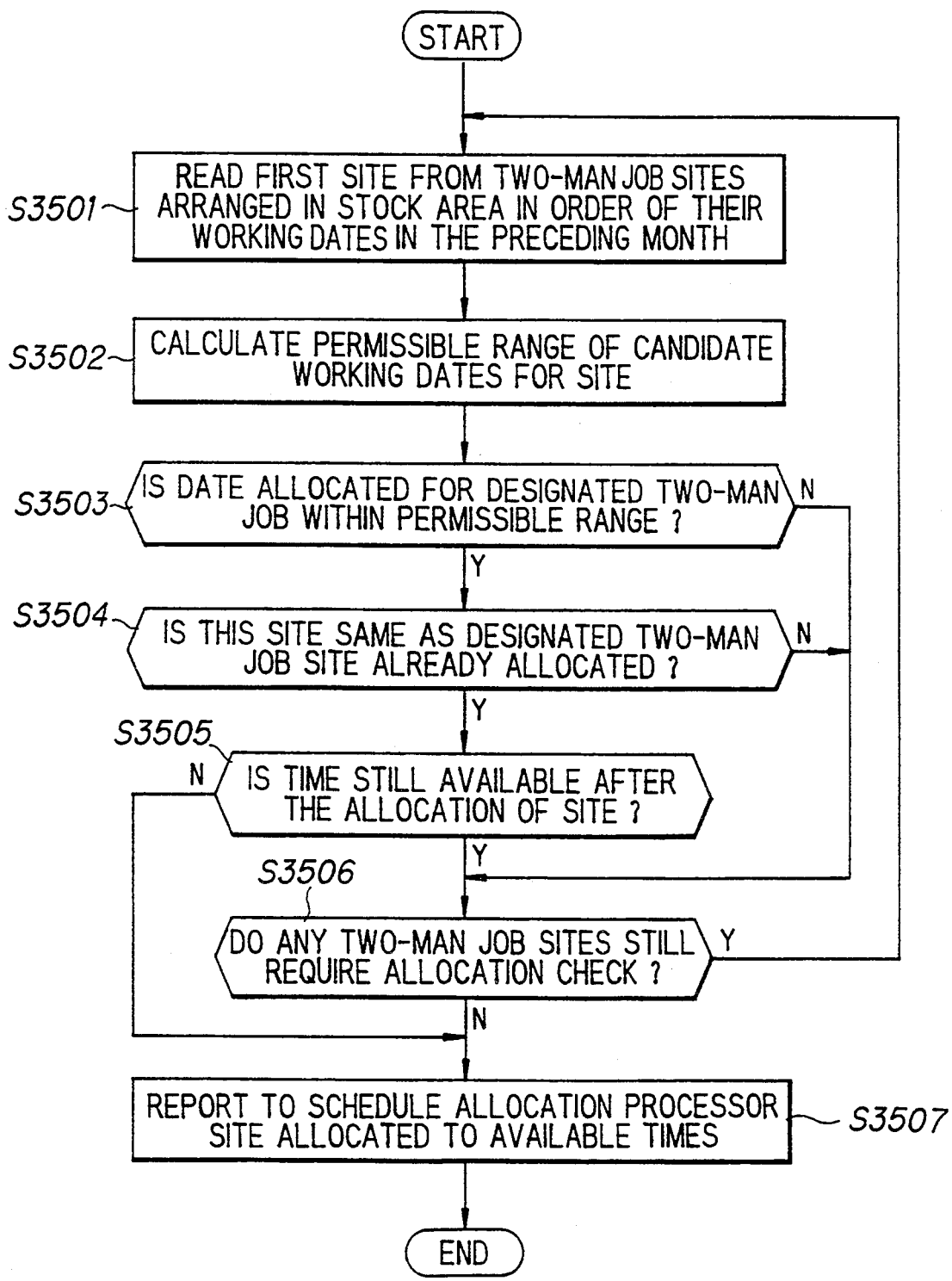

The operation of the site information processor 14a—which has been requested by the schedule allocation processor 14c to retrieve the site to be allocated to the available time in steps $S_{352}$ and $S_{353}$ of FIG. 7—will now be described with reference to the flow chart of FIG. 8. In this request, the available times of the workers, the date for allocation and the previously allocated sites are transmitted from the schedule allocation processor 14c to the site information processor 14a.

The site information processor 14a reads to its own stock area one of two-man job sites stored in order of their working dates in the preceding month (step $S_{3501}$). With respect to this site, candidate working dates are next calculated based on the interval from the last working date (step $S_{3502}$). It is then judged if any of the already allocated date(s) falls on the candidate working dates (step $S_{3503}$). It is also judged if the site is in the same area as the two-man job site(s) already allocated (step $S_{3504}$). Further, the working time of the site and the transmitted available time are compared to each other in order to judge if there will still be available time after the allocation of the site (step $S_{3505}$). If it is judged that there would not be any sufficient available time, the site is reported to the schedule allocation processor 14c as a site to be allocated to the available time (step $S_{3507}$).

When any of the allocated dates is not judged to fall on the candidate working dates in step $S_{3503}$, the site is judged to be located in a site different from that of the already allocated site(s) in step $S_{3504}$, or it is judged that there would still be sufficient available time in step $S_{3505}$, the schedule allocation processor 14c requests the site information memory 11 if there is(are) still any two-man job site(s) requiring allocation check (step $S_{3506}$). If there is(are) such site(s), the processings of step $S_{3501}$ onwards will be repeated.

The processing of step $S_3$ depicted in FIG. 3 has been described above. According to this processing, boxes to which two-man job(s) with designated working date(s) have been allocated are retrieved successively from July 1 and any box(es) so retrieved is(are) then filled with two-man job site(s).

(3) Processing of Step $S_4$ in FIG. 3 (FIGS. 9–12)

Figure 9:
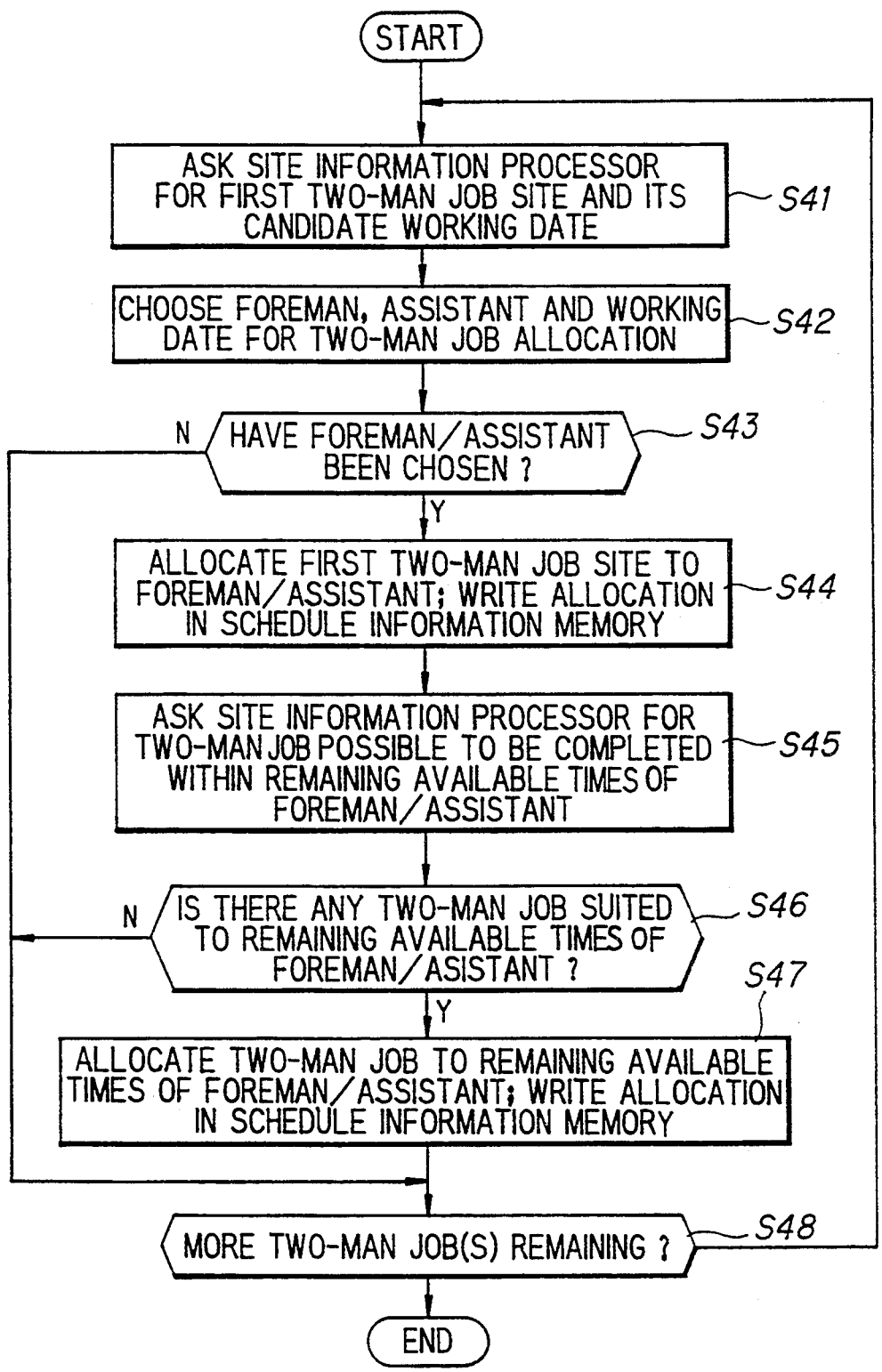

After the boxes with two-man job site(s) allocated thereto have been filled with other two-man job site(s) in step $S_3$, still remaining two-man job sites are allocated to vacant boxes. This processing is the processing of step $S_4$. First, as illustrated in FIG. 9, the schedule allocation processor 14c asks the site information processor 14a for the first two-man job site in the list of the remaining two-man job sites. The site information processor 14a then replies the first two-man job site and the candidate working dates for the site (step $S_{41}$). Based on the reply, the schedule allocation processor 14c performs processing to decide a date and workers (a qualified worker and an assistant) to which the site is to be allocated (step $S_{42}$). Details of this processing are illustrated in FIG. 10.

Figure 10:
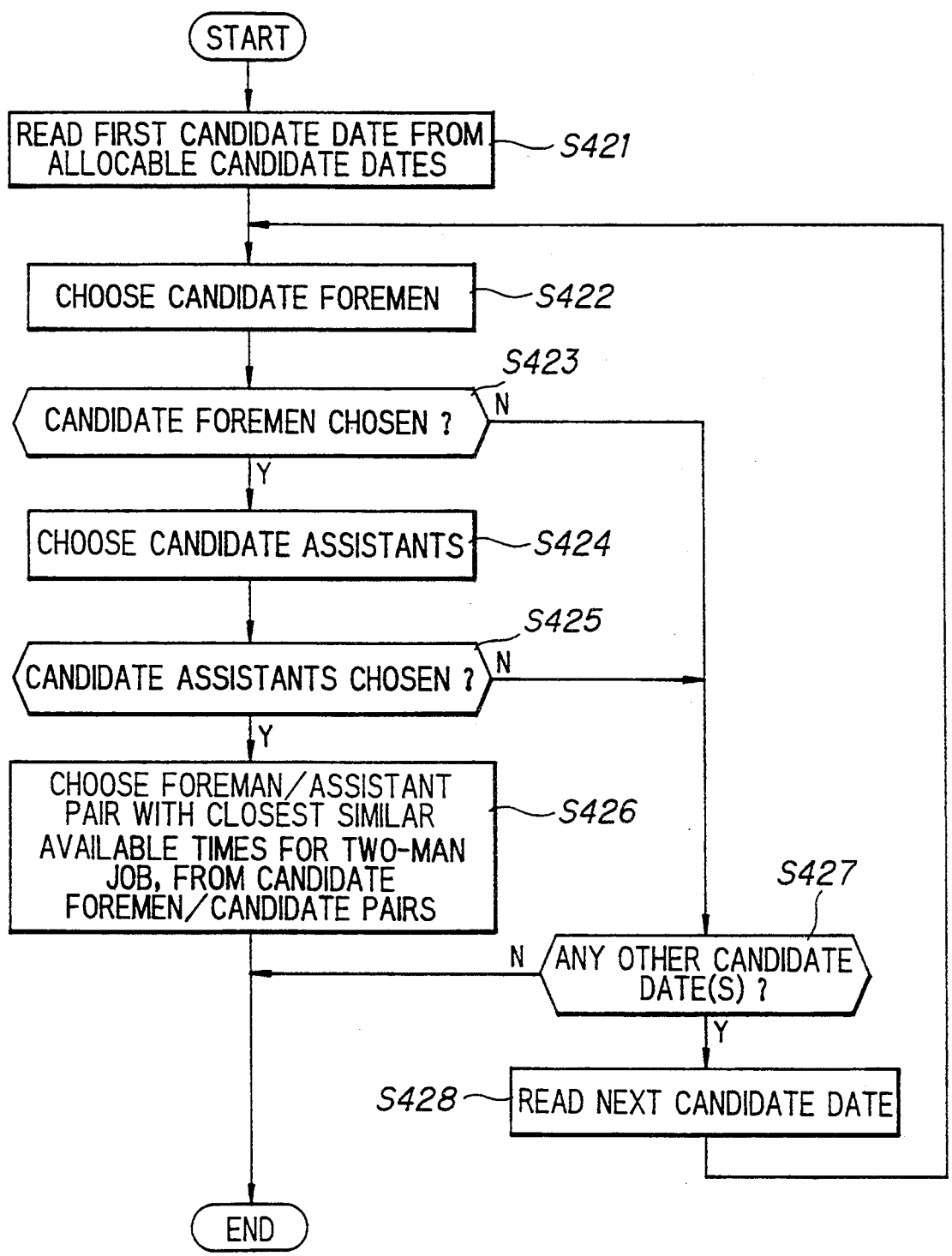

In FIG. 10, the schedule allocation processor 14c reads the first date from the candidate working dates transmitted thereto (step $S_{421}$). Incidentally, the transmitted candidate working dates are arranged in descending preference order. Processing is then performed to decide a group of candidate foremen (qualified workers) available on the first date (for example, Mr. a, Mr. b and Mr. c in FIG. 2) (step $S_{422}$—this processing is illustrated in detail in FIG. 11). Subsequent to the decision of the group of candidate foremen, further processing is performed similarly to decide a group of candidate assistants (for example, Mr. a to Mr. f in FIG. 2 (step $S_{424}$—this processing is also shown in detail in FIG. 11). After the group of candidate assistants has been decided, both the groups are compared with each other to choose, as a foreman/assistant pair for the two-man job, a foreman/assistant pair with closest similar available times (step $S_{426}$). The routine then advances to step $S_{43}$ in FIG. 9.

In the processing described above, it is judged if the site has other candidate working date(s) if any qualified candidate cannot be decided for the first candidate working date under circumstances such that none of qualified workers has available time on that date or other site(s) has(have) been allocated to the qualified workers (step $S_{427}$). If there is(are) any other candidate working date(s), the next candidate working date is read (step $S_{428}$), followed by the execution of the processings of step $S_{422}$ onwards. These processings are also followed in a similar manner when the decision of candidate assistants is judged impossible (step $S_{425}$). If the two-man job site is judged to have no other candidate working date in step $S_{427}$, the allocation of the two-man job site is not feasible. If this happens, manual allocation is made after the completion of the whole allocation work so that the two-man job site can be allocated, for example, to overtimes.

Figure 11:
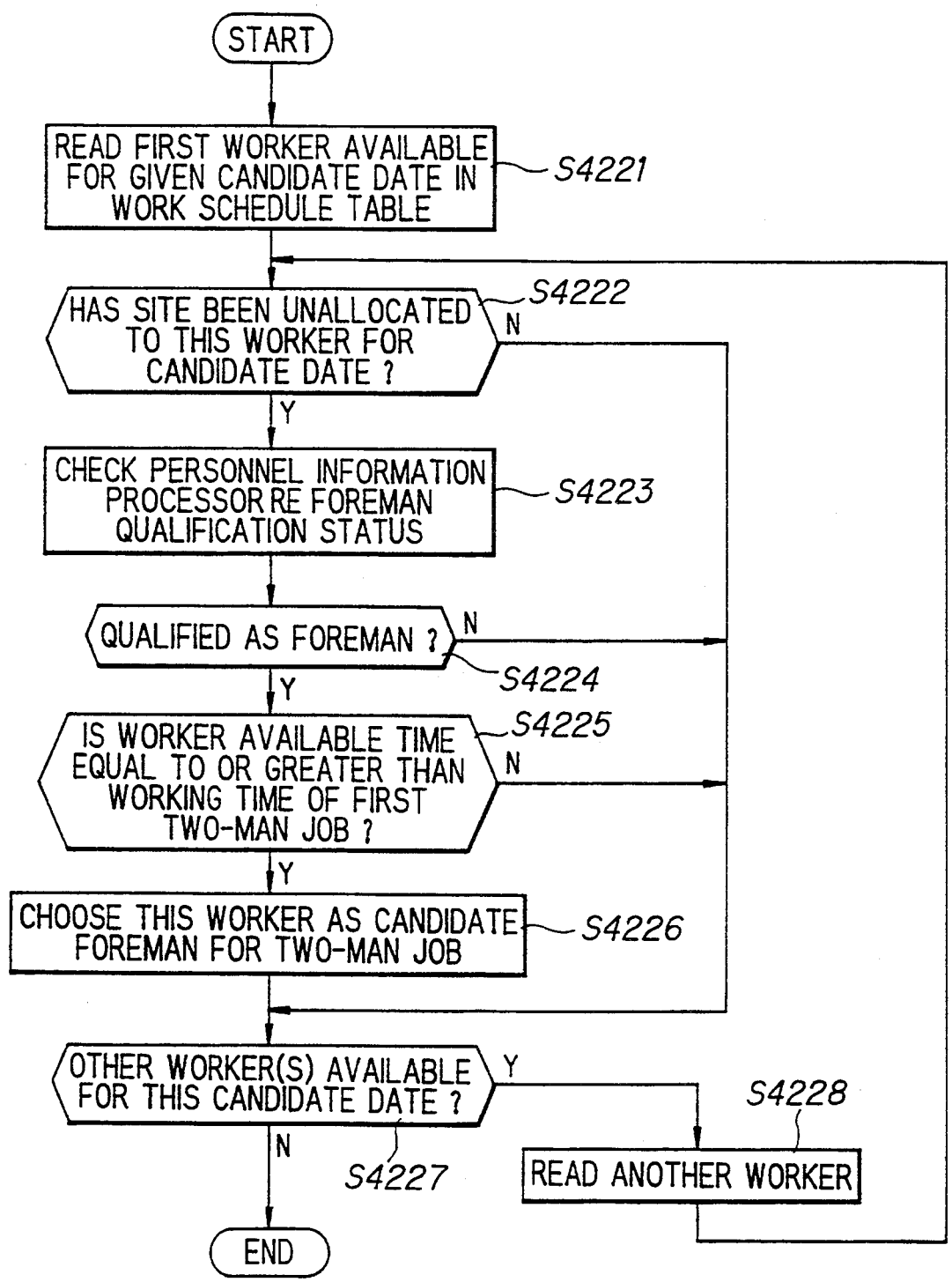

The processings of steps $S_{422}$ and $S_{424}$ will now be described in detail with reference to FIGS. 11 and 12, respectively. FIG. 11 is a flow chart showing the extraction method for the group of qualified workers (foremen). For the candidate working date, the schedule allocation processor 14c first reads the first worker (Mr. a in the case of FIG. 2) from the worker list (step $S_{4221}$) and then judges if any site has been allocated to the box defined by the candidate date and the worker (step $S_{4222}$). If no site has been allocated to the box, the schedule allocation processor 14c asks the personnel information processor 14b if he is a qualified worker (step $S_{4223}$). When he is judged to be a qualified worker, the schedule allocation processor 14c judges if the available time of the worker is equal to or longer than the working time of the two-man job site which the preparator now wants to allocate (step $S_{4225}$). If his available time is equal to or longer than the working time, this worker is chosen as a qualified worker for the two-man job site (step $S_{4226}$). Other candidate worker(s) are identified in the steps $S_{4227}$ and $S_{4228}$, whereby the group of candidate qualified workers is decided in step $S_{422}$ of FIG. 10.

Figure 12:
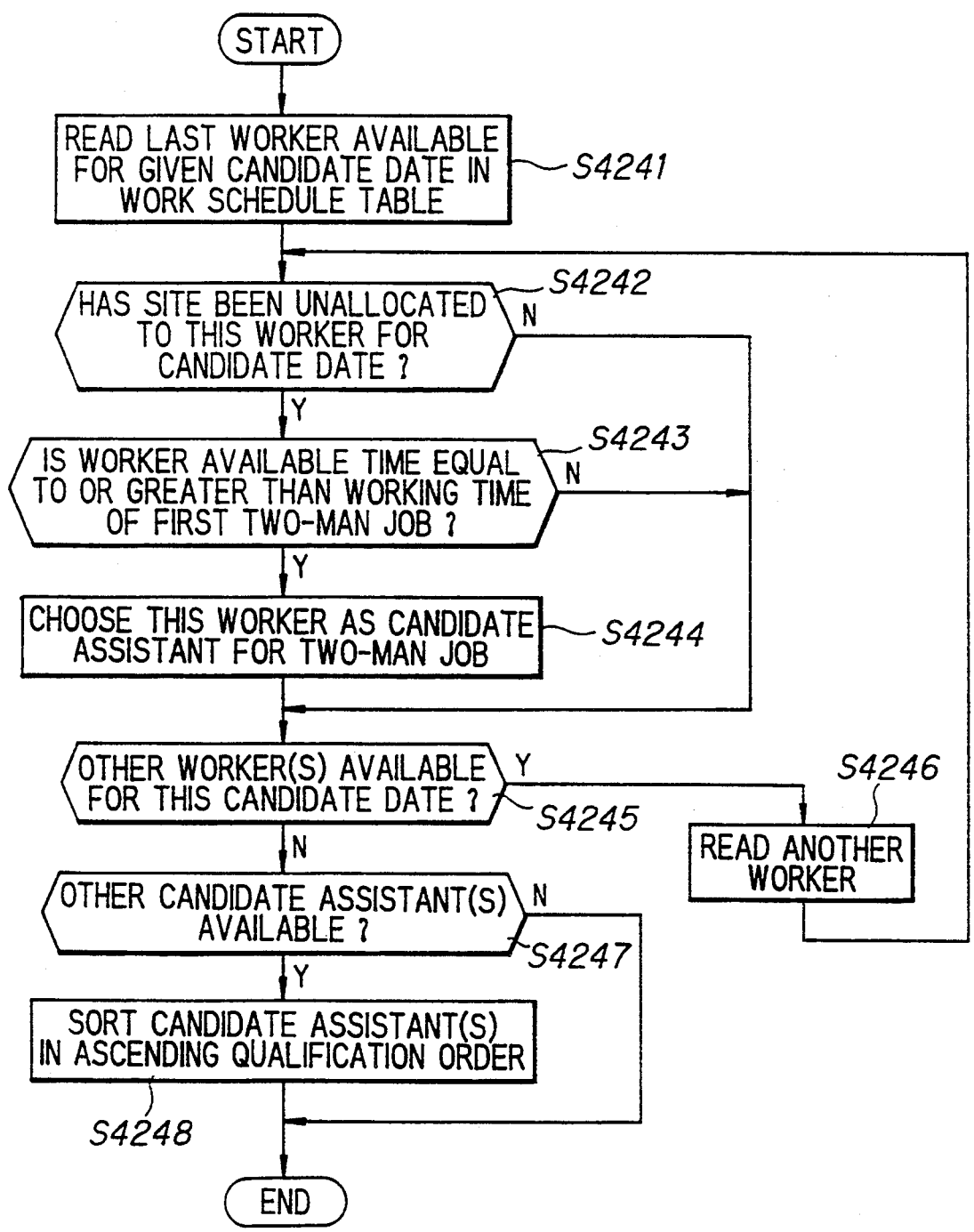

FIG. 12 is a flow chart showing the extraction method for the group of assistants. For the above candidate working date, the schedule allocation processor 14c reads the last worker (Mr. f in FIG. 2) from the worker list (step $S_{4241}$). In this case, there is no particular significance in reading the worker from the end of the list. A judgement is then made as to whether or not any site has been allocated to the candidate working date of the worker (step $S_{4242}$). If no site has been allocated to the box, the schedule allocation processor 14c checks if the available time of the worker is longer than the working time of the two-man job site (step $S_{4243}$). If his available time is longer, he is chosen as a candidate assistant (step $S_{4244}$) and other candidate assistant(s) are then identified in the steps $S_{4245}$ and $S_{4246}$. After the group of candidate assistants has been extracted as described above, these assistants are arranged and numbered in ascending qualification order (step $S_{4248}$). It is to form qualified/non-qualified worker pairs as many as possible and to retrieve them as fast as possible that the workers are numbered in order as described above.

The processing of step $S_{42}$ in FIG. 9, namely, the processing for deciding the working date, the worker qualified for two-man jobs and his assistant for the first site in the list of the two-man job sites has been described above with reference to FIG. 10 to FIG. 12. Upon completion of this processing, the schedule allocation processor 14c judges if they have been decided. When they have been decided, the two-man job site is allocated to the boxes defined by the decided working date and the decided two workers, respectively, and this allocation is written in the schedule information memory (step $S_{44}$). The schedule allocation processor 14c then calculates the available times of the two workers and asks the site information processor 14a if there is any other two-man job site possible to be completed within the remaining available times (step $S_{45}$). When the site information processor 14a judges that there is such a site (step $S_{46}$), the site information processor 14a outputs the site to the schedule allocation processor 14c so that the schedule allocation processor 14c allocates the site to the respective boxes and write this allocation in the schedule information memory 13 (step $S_{47}$).

When the allocation to the respective boxes has been completed as described above, if it is judged impossible to decide workers and working date in Step $S_{43}$, or if it is judged that there is no appropriate two-man job site in step $S_{46}$, the schedule allocation processor 14c asks the site information processor 14a if there is(are) any other two-man job site(s) remaining for allocation (step $S_{48}$). If any, the routine returns to step $S_{41}$.

The allocation of two-man job sites is executed as described above. If two-man job site(s) still remain unallocated after the above allocation, such unallocated two-man job sites are manually allocated, for example, to overtimes of certain workers as described above.

Figure 13:
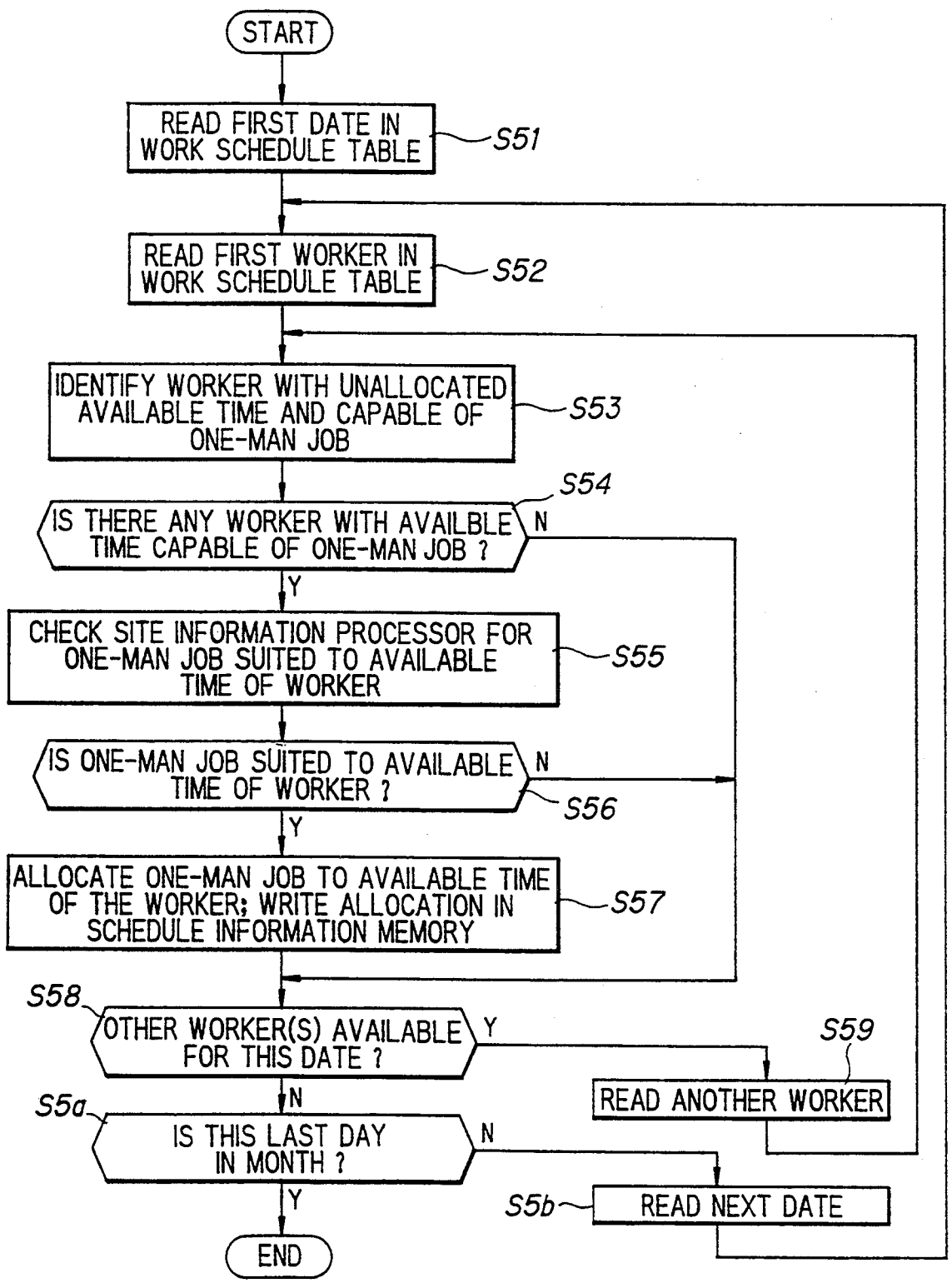
Figure 14:
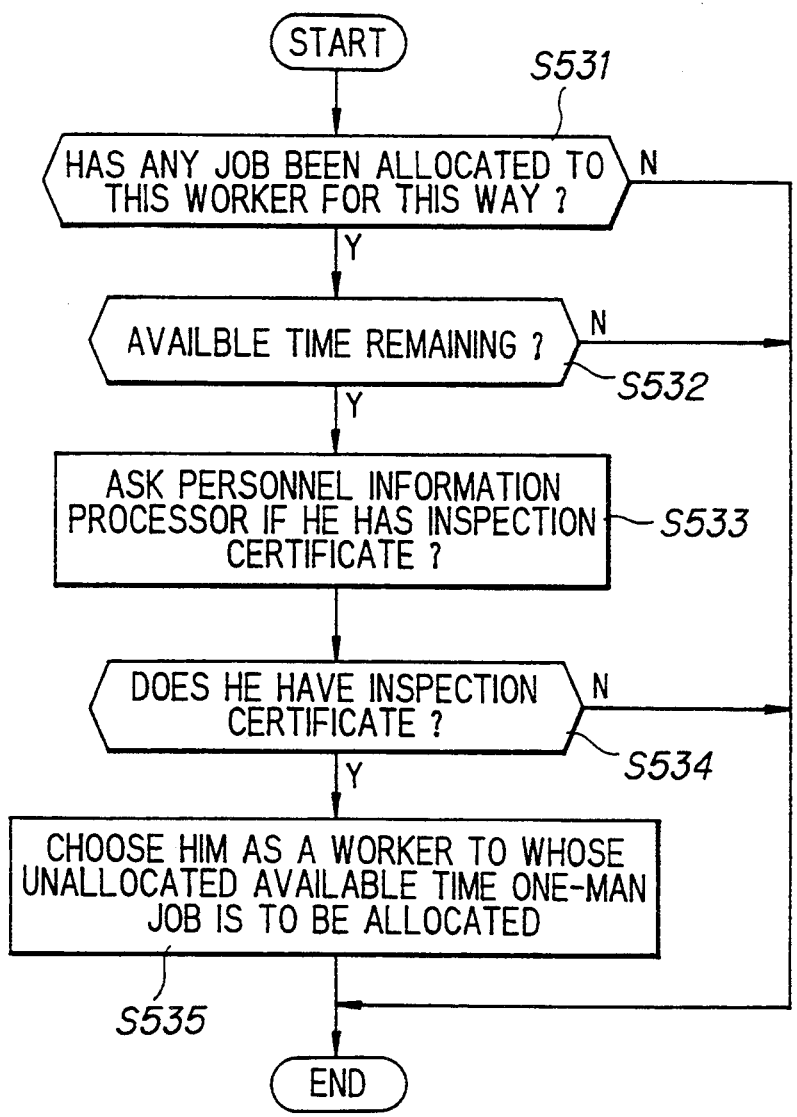
Figure 15:
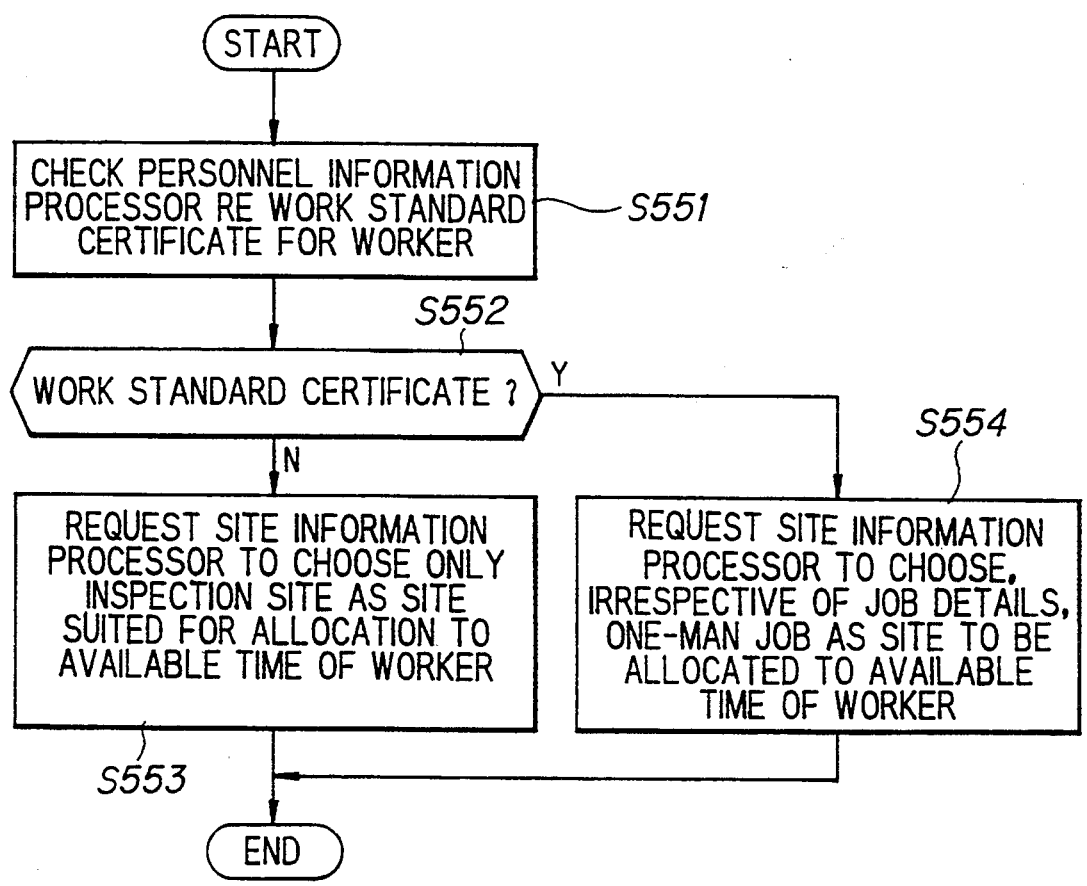

(4) Processing of Step $S_5$ in FIG. 3 (FIGS. 13-15)

Next, the allocation of one-man job sites is conducted. This allocation is effected in such a way that boxes with already allocated site(s) are first filled with such one-man job sites.

In FIG. 13, the schedule allocation processor 14c extracts July 1 and Mr. a in a similar manner to steps $S_{31}$ and $S_{32}$ of FIG. 5 (steps $S_{51}$ and $S_{52}$). The routine then advances to step $S_{53}$. The processing in this step will be described in detail with reference to FIG. 14.

In the flow chart of FIG. 14, the schedule allocation processor 14c judges if any site(s) has(have) already been allocated to the box of Mr. a for July 1 (step $S_{531}$) and also if Mr. a has any available time (step $S_{532}$). If site(s) has(have) already been allocated and Mr. a has available time, the schedule allocation processor 14c asks the personnel information processor 14b for the qualification status of Mr. a (step $S_{533}$). When Mr. a is judged to have the "inspection" certificate or higher as a result of a reply from the personnel information processor 14b (step $S_{534}$), Mr. a is chosen as a worker for the one-man job (step $S_{535}$) and the routine then advances to step $S_{54}$ in FIG. 14.

If the above box is not judged to be one with already allocated site(s) in step $S_{531}$, on the other hand, the routine moves to steps $S_{5a}$ and $S_{5b}$ in FIG. 13, where July 2 is read and the processings of step $S_{52}$ onwards are repeated. Further, if it is judged in steps $S_{532}$ and $S_{534}$ that Mr. a does not have available time or Mr. a has no qualification or certificate, the routine advances to step $S_{58}$ in FIG. 13, where the next worker Mr. b is read (steps $S_{58}$ and $S_{59}$). Then, the processing of step $S_{53}$ is repeated with respect to Mr. b for July 1.

FIG. 13 is referred to again. When it has been judged in step $S_{54}$ that there is a worker, the schedule allocation processor 14c requests the site information processor 14a about a one-man job site suited for allocation to the worker (step $S_{55}$). Details of this processing is illustrated in the flow chart of FIG. 15. Namely, the schedule allocation processor 14c first asks the personnel information processor 14b if this worker has the "work standard" certificate (step $S_{551}$). If the worker is not judged to have it (step $S_{552}$), the schedule allocation processor 14c requests the site information processor 14a to choose an inspection sites. If the worker is judged to have the "work standard" certificate in step $S_{552}$, the schedule allocation processor 14c requests the site information processor 14a to choose a one-man job site, irrespective of job details.

The processing of step $S_{55}$ in FIG. 13 has now been completed, and the routine then moves to step $S_{56}$ where it is judged if there is a one-man job site possible to be allocated to the available time of the worker. When a one-man job site is judged to exist, the schedule allocation processor 14c allocates it to the appropriate box and writes the allocation in the schedule information memory 13 (step $S_{57}$). Then, another worker available on the same date is read (steps $S_{58}$ and $S_{59}$) and similar processings are repeated with respect to the box of the worker. If there is no other worker available on the same date, the next date is read (steps $S_{5a}$ and $S_{5b}$) and similar processings are repeated.

Figure 16:
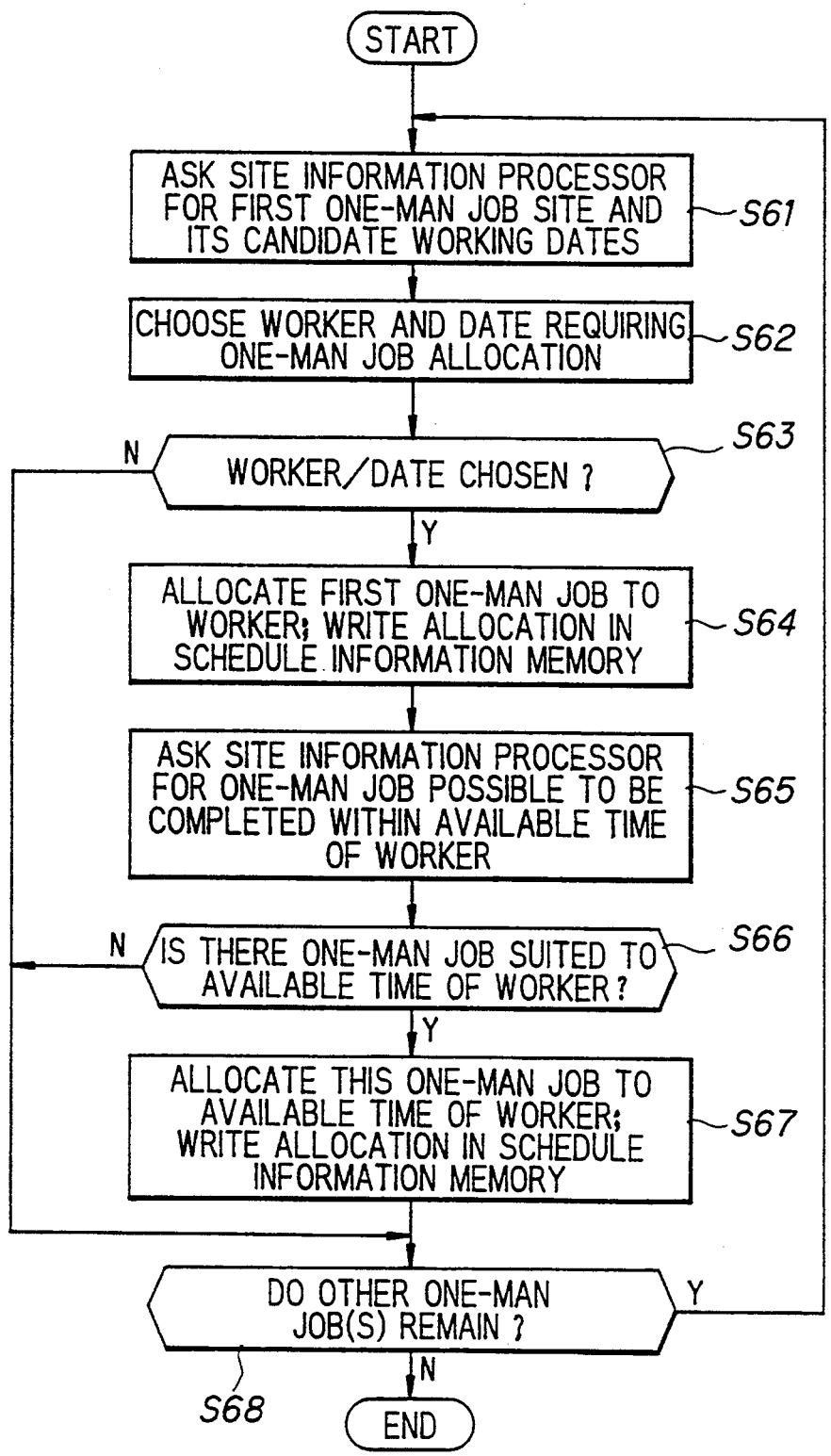
Figure 17:
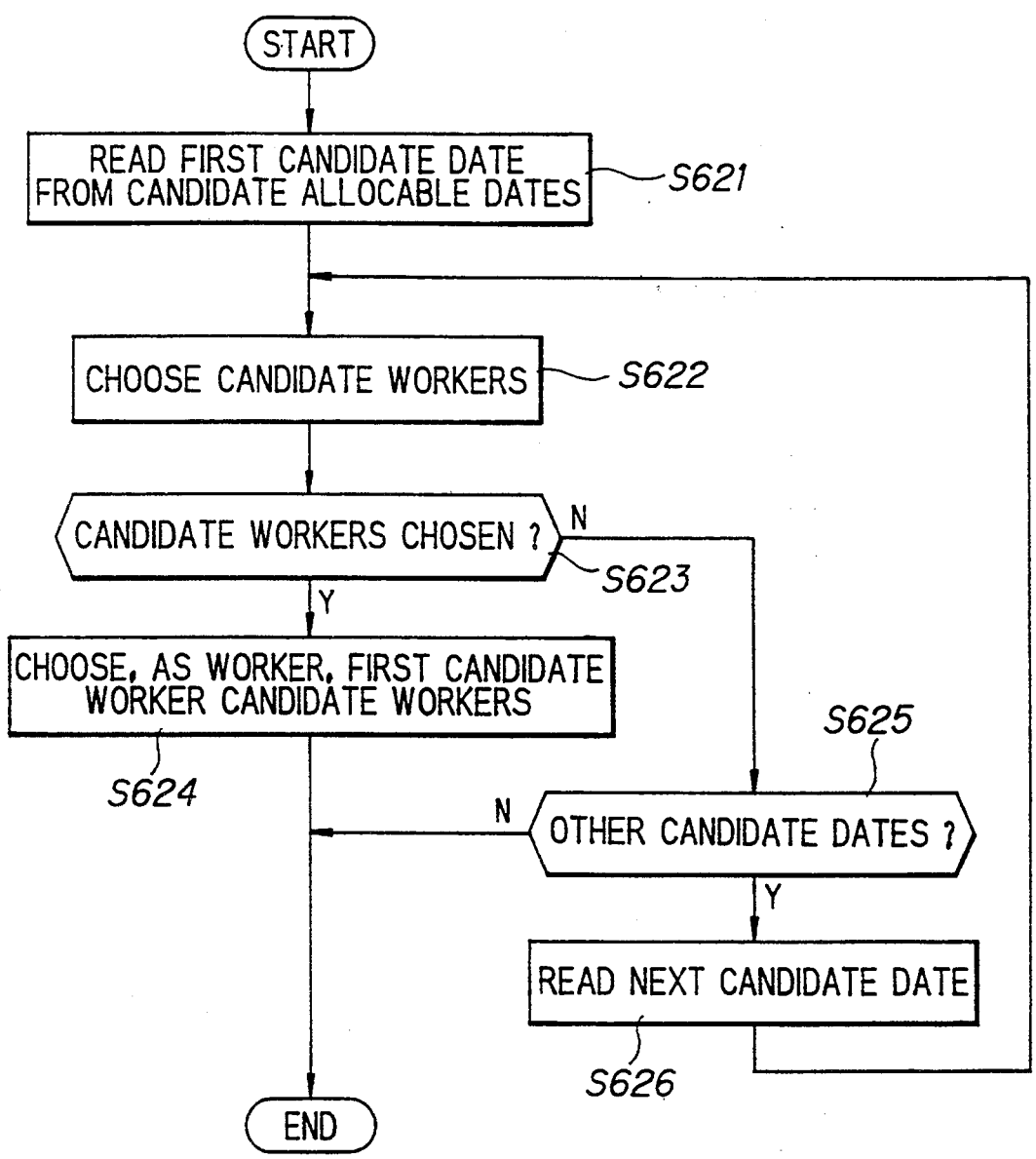
Figure 18:
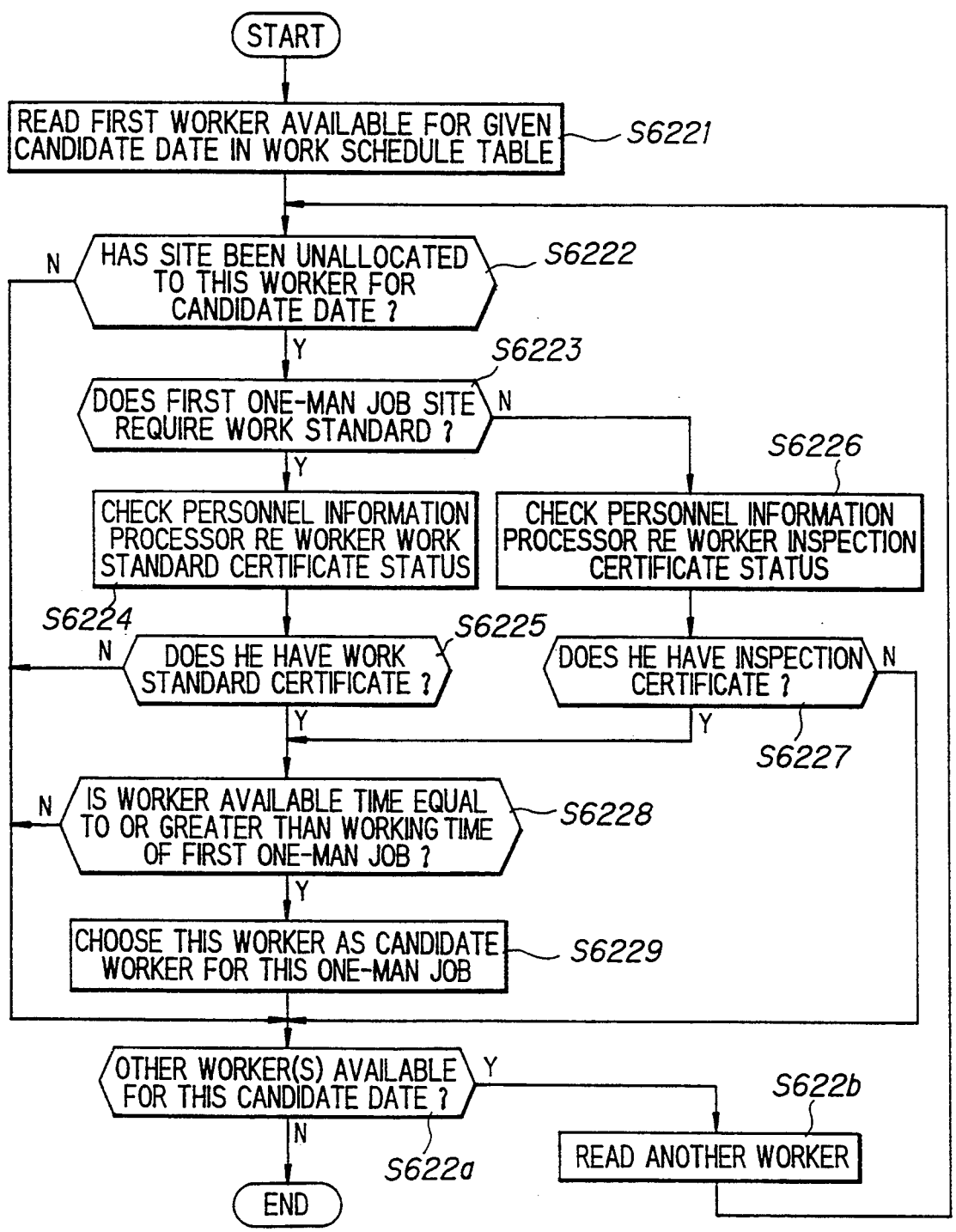

(5) Processing of Step $S_6$ in FIG. 3 (FIGS. 16–18)

After one-man jobs have been allocated to the boxes with already allocated site(s) and the respective boxes have been filled with the corresponding sites, the allocation of one-man jobs to the vacant boxes is performed (step $S_6$ in FIG. 3). This processing will hereinafter be described.

The schedule allocation processor 14c requests the site information processor 14a about the first site in the list of the one-man job sites and its candidate working dates (step $S_{61}$ in FIG. 16). Based on a reply from the site information processor 14a, the schedule allocation processor 14c decides a working date and a worker for the one-man job site (step $S_{62}$). This processing is shown in the flow chart of FIG. 17. Namely, the first candidate working date is read out of the candidate working dates so replied (these candidate working dates are arranged in descending preference order as in the foregoing case) (step $S_{621}$). Then, candidate workers (group) are decided (step $S_{622}$; details of this processing will be described subsequently). When these candidate workers have been decided (step $S_{623}$), the first worker in the candidate list is chosen as the worker for the site on the working date (step $S_{624}$) and the routine advances to step $S_{63}$ in FIG. 16.

The choice of the worker in step $S_{624}$ is performed in accordance with the flow chart shown in FIG. 18. The schedule allocation processor 14c reads the first worker (Mr. a in the case of FIG. 2) in the worker list for the first candidate working date (step $S_{6221}$) and then judges if any site(s) has(have) been allocated to the box defined by the first candidate working date and Mr. a (step $S_{6222}$). If no site has been allocated to the box, the schedule allocation processor 14c requests the site information processor 14a and judges if the one-man job site replied as a result of the processing of step $S_{61}$ in FIG. 16 is a work-standard-applied site (step $S_{6223}$). If it is a work-standard-applied site, the schedule allocation processor 14c asks the personnel information processor 14b if Mr. a has the "work standard" certificate (step $S_{6224}$) to judge it (step $S_{6225}$). If the one-man job site is not a work-standard-applied site, the schedule allocation processor 14c asks the personnel information processor 14b if Mr. a has the "inspection" certificate (step $S_{6226}$). This is judged in step $S_{6227}$. If Mr. a is judged to have the certificate in steps $S_{6225}$ and $S_{6227}$, this means that Mr. a can work at the one-man job site. The schedule allocation processor 14c then judges if the available time of Mr. a is equal to or longer than the working time of the one-man job (step $S_{6228}$). If his available time is equal to or longer than the working time of the one-man job, Mr. a is identified as a candidate worker for the one-man job (step $6229$).

If one or more site(s) has(have) already been allocated to the box in step $S_{6222}$, the routine advances to step $S_{625}$ in FIG. 17 to read the next candidate working date. If Mr. a is judged not to have the certificate in steps $S_{6225}$ and $S_{6227}$ or if the available time of Mr. a has been judged to be shorter than the working time of the one-man job, the routine then advances to steps $S_{622a}$ and $S_{622b}$ so that another worker on the same date is identified and is subjected to the processings of $S_{622}$ onward. In this manner, the candidate workers for the one-man job are successively extracted. If it is judged that there is no worker, the routine advances to $S_{623}$ in FIG. 17.

The results of the above processings are judged in step $S_{63}$. If both a worker and a working date have been chosen, the schedule allocation processor 14c allocate the one-man job site to them and write this allocation in the schedule information memory (step $S_{64}$). Then, the schedule allocation processor 14c calculate the still remaining available time of the worker and asks the site information processor 14a if there is any one-man job site possible to be completed within the available time of the worker (step $S_{65}$). If it is judged that there is a one-man job suited to the available time of the worker (step $S_{66}$), the one-man job site is allocated to the box and this allocation is written in the schedule information memory 13 (step $S_{67}$).

When the above processings have been completed, if neither a worker nor a working date has been found not to be chosen in step $S_{63}$ or if no one-man job site has been found to exist for allocation in step $S_{66}$, the schedule allocation processor 14c asks the site information processor 14a if any one-man job site remains unallocated (step $S_{68}$). If there is still any unallocated one-man job site, the processings of step $S_{61}$ onward are repeated with respect to this site. If there is no unallocated one-man job site, this means that the entire allocation work has been completed. If there is(are) any one-man job site(s) remaining unallocated, such remaining one-man job site(s) will be allocated, for example, to overtimes as described above.

The allocation operation of this embodiment has been described above. Finally, the sites so allocated are displayed on the display unit 2b or printed at the printer unit f, in the form of the table shown in FIG. 2. If there is(are) still any unallocated site(s), the unallocated site(s) can be allocated manually as described above. To conduct this manual allocation, the sites which have already been allocated are displayed in the form of the table shown in FIG. 2 on the display unit 2b and, in addition, the unallocated site(s) is(are) displayed in the leftmost box shown in FIG. 2. By operating the input unit 2c, the unallocated site(s) is(are) then allocated successively.

As has been described above, most of the working site allocation work can be automatically carried out in the above embodiment so that the load of the work schedule preparator can be reduced substantially.

We claim:

1. A cyclic maintenance work schedule table preparation computerized system retained by a contractor having concluded a contract with persons owning or managing buildings to have workers conduct maintenance of equipment installed in the buildings, said system having a display unit for showing thereon boxes wherein dates in a desired period, the names of individuals workers, and the names of the buildings allocated to the boxes to allocate the individual workers to the contracted buildings are displayed, said system comprising:

worker data memory means for storing scheduled work information of the individual workers during the period and work qualifications of the individual workers as to whether they can perform a two-man maintenance job or a one-man maintenance job;

building data memory means for storing the building names work details including whether each job is a two-man maintenance job or a one-man maintenance job, last working dates, and contracted frequencies of maintenance work of building to be worked during the period;

first means for computing the remaining working time of each worker in each box allocated with one or more buildings;

second means for computing working dates in the period for non-scheduled buildings whose working dates have not yet been designated, on the basis of the contracted frequencies of maintenance work stored in the building data memory means;

first means for allocating the buildings, whose working dates have been designated, to boxes of qualified workers on the designated working dates;

second means for allocating the names of two-man job buildings out of the non-scheduled building to the boxes on the basis of the data of the worker data memory means, the data of the building data memory means, and results from the said first and said second means for computing and, when the remaining working time of the workers whose names were allocated to the boxes becomes insufficient, the remaining two-man job buildings are allocated to other boxes; and third means for subsequently allocating to boxes the names of one-man job buildings out of the non-scheduled buildings on the basis of the data of the worker data memory means, the data of the building memory means, results of said first and said second computing means, and when the remaining working time of the workers in these boxes becomes, insufficient, the remaining one-man job buildings are allocated to unallocated boxes.

2. A cyclic maintenance work schedule table preparation system according to claim 1, wherein each of the designated buildings has been designated not only in working date but also in worker or workers.

3. A cyclic maintenance work schedule table preparation system according to claim 2, wherein said second allocating means first allocates each designated building to the box of the designated worker or workers on the designated date.

4. A cyclic maintenance work schedule table preparation system according to claim 1, wherein said second computing means takes into consideration the frequencies of maintenance work and the last working dates.

5. A cyclic maintenance work schedule table preparation system according to claim 1, wherein said first computing means computes, with respect to each worker to whom the names of at least one building has been allocated, the remaining working time from the working time schedule for the allocated working date and the working time of the worker in a day.

6. A method for the preparation of a cyclic maintenance work schedule table on a cyclic maintenance work schedule table preparation computerized system, said system having a display unit capable of showing thereon boxes wherein dates in a desired period, the names of individual workers and the names of the buildings allocated to the boxes so that a contractor having concluded a contract with persons owning or managing buildings to have workers conduct maintenance of equipment installed in the buildings can allocate the individual workers to the contracted buildings, said method comprising the steps of:

providing a worker data memory for storing scheduled work information of the individual workers during the period and work qualifications of the individual workers as to whether they can perform a two-man maintenance job or a one-man maintenance job in;

providing a building data memory for storing the names work details as to whether each maintenance work is a two-man job or a one-man job, last working dates, designated working dates and contracted frequencies of maintenance work of building to be worked during the period;

reading from the building data memory at least one designated building whose scheduled maintenance work date has been designated and allocating the building so read to the box of at least one appropriate worker on said work date;

computing the remaining working time of each worker in each box allocated with a building;

computing working dates of the non-scheduled buildings on the basis of the last working dates and the contracted frequencies of maintenance work stored in the building data memory;

reading the names of two-man job buildings from the building data memory and allocating the two-man job buildings to boxes on dates permitting the maintenance work of the buildings, in which boxes the designated buildings have been allocated and working time still remains;

allocating remaining two-man job building to boxes on dates permitting maintenance work, in which boxes working time still remains;

computing the remaining working time of the boxes to which the two-man jobs have been allocated as described above;

reading one-man job buildings from the building data memory and allocating the one-man job buildings to boxes on date permitting the maintenance work of the buildings, in which boxes buildings have already been allocated and working time still remains; and allocating remaining one-man job buildings to boxes on dates permitting maintenance work, in which boxes working time still remains.

* * * * *